United States Patent [19]

Hayashi et al.

[11] 4,116,176

[45] Sep. 26, 1978

[54] DUAL SPARK PLUG IGNITION INTERNAL COMBUSTION ENGINE HAVING IMPROVED CYLINDER HEAD CONFIGURATION

[75] Inventors: Yoshimasa Hayashi, Yokohama; Yasuo Nakajima, Yokosuka, both of Japan

[73] Assignee: Nissan Motor Company, Limited, Yokohama, Japan

[21] Appl. No.: 768,876

[22] Filed: Feb. 15, 1977

[30] Foreign Application Priority Data

Feb. 16, 1976 [JP] Japan ................................ 51-15703

[51] Int. Cl.² ........................................... F03M 25/06
[52] U.S. Cl. ........................... 123/119 A; 123/188 M; 123/191 M
[58] Field of Search ........... 123/188 M, 119 A, 191 R, 123/191 M

[56] References Cited

U.S. PATENT DOCUMENTS

| T903,020 | 10/1972 | Cook et al. | 123/188 M |
|---|---|---|---|
| 3,145,696 | 8/1964 | Baster | 123/188 M X |
| 3,270,733 | 9/1966 | Steidler | 123/188 M |
| 3,313,278 | 4/1967 | Thuesen | 123/188 M X |
| 3,444,852 | 5/1969 | Biabaud | 123/188 M |

FOREIGN PATENT DOCUMENTS

| 1,072,005 | 12/1959 | Fed. Rep. of Germany | 123/188 M |
|---|---|---|---|
| 1,956,350 | 5/1971 | Fed. Rep. of Germany | 123/188 M |
| 2,012,436 | 11/1970 | Fed. Rep. of Germany | 123/188 M |
| 2,621,599 | 5/1976 | Fed. Rep. of Germany | 60/278 |
| 2,626,773 | 6/1976 | Fed. Rep. of Germany | 60/278 |
| 41,348 | 8/1937 | Netherlands | 123/188 M |
| 682,450 | 11/1952 | United Kingdom | 123/188 M |
| 274,536 | 1/1970 | U.S.S.R. | 123/188 M |

*Primary Examiner*—Wendell E. Burns
*Attorney, Agent, or Firm*—Bacon & Thomas

[57] ABSTRACT

Intake and exhaust valves and an intake port of an internal combustion engine are arranged so that strong swirl turbulence of the inducted air-fuel mixture is produced in the combustion chamber. The swirl turbulence improves the combustion of the air-fuel mixture mixed with exhaust gases, initiated by the ignition with two spark plugs disposed in the combustion chamber.

8 Claims, 4 Drawing Figures

DUAL SPARK PLUG IGNITION INTERNAL COMBUSTION ENGINE HAVING IMPROVED CYLINDER HEAD CONFIGURATION

BACKGROUND OF THE INVENTION

This invention relates in general to an internal combustion engine in which an air-fuel mixture mixed with a relatively large amount of the exhaust gases is ignited with two spark plugs in a combustion chamber, and more particularly to a cylinder head configuration of the same engine.

In order to suppress the generation of nitrogen oxide (NOx) during combustion of the air-fuel mixture in the combustion chambers of automotive internal combustion engines, it has already been proposed that two spark plugs are disposed spaced apart in the combustion chamber to ignite and combust an air-fuel mixture mixed with a considerably large amount of the exhaust gases fed into the combustion chamber. In general, as the amount of the exhaust gas feed increases, the combustion time is prolonged and accordingly the engine running becomes unstable. However, by the effect of the above-mentioned two spark plug ignition, the combustion time of the mixture in the combustion chamber is shortened, causing stable and smooth running of the engine.

Furthermore, the thus arranged engine is required to improve and stabilize the combustion in the combustion chamber in order to improve fuel consumption characteristics and engine output performance characteristics in addition to reducing noxious gas emission.

SUMMARY OF THE INVENTION

Therefore, it is the prime object of the present invention to provide an improved internal combustion engine arranged such that an air-fuel mixture mixed with a considerably large amount of exhaust gases is ignited with two spark plugs disposed in a combustion chamber, in which the combustion time of the air-fuel mixture is shortened compared with prior art and consequantly the engine running is smooth and stable compared with the prior art.

Another object of the present invention is to provide an internal combustion engine having an improved cylinder head configuration by which air and fuel inducted into the combustion chamber are uniformly and homogeneously mixed to cause a short combustion time of the air-fuel mixture.

A further object of the present invention is to provide an internal combustion engine having an improved cylinder head configuration by which strong swirl turbulence of the air-fuel mixture is produced in the combustion chamber without a considerable pressure drop of the incoming air passing through the intake port.

Other objects, features, and advantages of the internal combustion engine according to the present invention will be more apparent from the following description of a preferred embodiment thereof, taken in conjunction with the accompanying drawings:

DETAILED DESCRIPTION OF PREFERRED EMBODIMENTS

Figure 1:
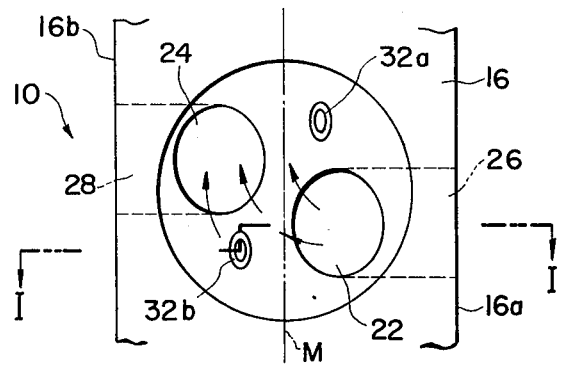
FIG. 1 is a schematic plan view of the cylinder head of a preferred embodiment of an internal combustion engine in accordance with the present invention.
Figure 2:
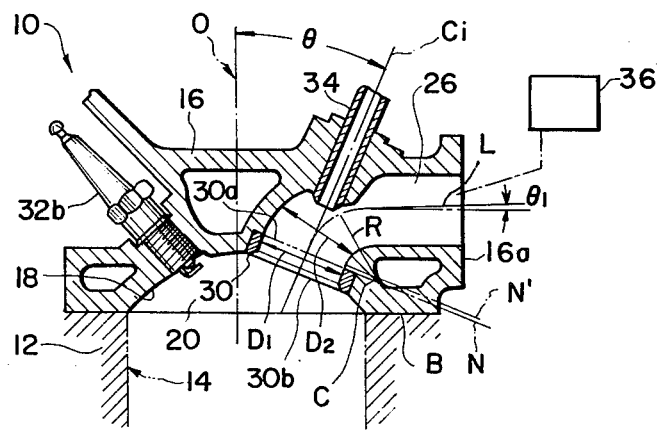
FIG. 2 is a cross-sectional view taken along the line I—I of FIG. 1.

Referring now to FIGS. 1 and 2 of the drawings, a preferred example of an internal combustion engine according to the present invention is designated generally by the reference numeral 10. The engine 10 is composed of an engine proper (no numeral) which has a cylinder block 12 in which a cylinder 14 or cylinders are, as customary, formed. Secured to the upper surface of the cylinder head 12 is a cylinder head 16 which is formed with a concavity 18 defining therein the upper part of a combustion chamber 20. The surface of the concavity 18 closes the one or upper end of the cylinder bore. As best seen in FIG. 1, intake and exhaust valve heads 22 and 24 are respectively seatably disposed on intake and exhaust valve seats (not shown in FIG. 1) secured at the spherical surface of the concavity 18. The intake and exhaust valve heads 22 and 24 are located opposite to each other with respect to a longitudinal vertical plane M parallel with the longitudinal axis (not shown) of the cylinder head 16 and parallel with and passing through the center axis O of the cylinder 14 or the center axes of the cylinders. Furthermore, the intake and exhaust valve heads 22 and 24 are located spaced apart from each other in the direction of the longitudinal axis of the cylinder head 16.

Indicated respectively by the reference numerals 26 and 28 are cylindrical intake and exhaust ports formed in the cylinder head 16. The intake port 26 is connected, at its one end, through the intake valve seat 30 (shown in FIG. 2) to the combustion chamber 20 and opens, at its other end, to one side surface 16a of the cylinder head 16. The exhaust port 28 is connected, at its one end, through the exhaust valve seat to the combustion chamber 20 and opens, at its other end, to the opposite side surface 16b of the cylinder head 16. This arrangement of the intake and exhaust ports 26 and 28 is referred to as a so-called cross-flow induction-exhaust arrangement. In the cross-flow induction-exhaust arrangement, it will be understood that the center axes of the intake and exhaust ports 26 and 28 may not be parallel with each other and may not intersect the longitudinal axis of the cylinder head 16 at the right angle, as viewed from the direction of the cylinder center axis O.

Two spark plugs 32a and 32b are disposed at the cylinder head 16 and projected to the combustion chamber 20 from the surface of concavity 18. The spark plugs 32a and 32b are located such that their electrodes (no numerals) projected into the combustion chamber lie generally symmetrical with respect to the center axis O of the cylinder 14 and are spaced apart from the cylinder center axis O.

As clearly shown in FIG. 2 in which the intake valve head is not shown but only its center axis along its valve stem (not shown) is indicated by a broken line $C_i$, $C_i$ intersects the center axis O of the cylinder at an angle $\theta$ of 22.5°±6°, as viewed from the direction of the longitudinal axis of the cylinder head. In this connection, the intake valve seat 30 is located so that its top and bottom surfaces 30a and 30b intersect the center axis $C_i$ of the intake valve 22 at a right angle, and therefore the center axis of the valve seat 30 corresponds to or is the same as that of the intake valve head 22. The intake port 26 is, as shown, curved such that its center axis L has a curved portion (no numeral) which is formed with the radius R of curvature in the range of 0.75±0.2 times the minimum inner diameter $D_1$ of the annular intake valve seat 30 or the throat diameter of the intake valve. The curved portion of the intake port center axis L smoothly joins at its one end the intake valve center axis $C_i$ as clearly shown in FIG. 2. The other end of the curved portion of the intake port center axis L joins a generally straight portion (no numeral) which corresponds to the tangent line of the curvature of the curved portion. It is to be noted that the generally straight portion of the intake port center axis L is generally parallel with the bottom surface B of the cylinder head 16, and preferably has an angle of inclination $\theta_1$ in the range from 0° to 8° with respect to the cylinder head bottom surface B, the cylinder head 16 being secured at the bottom surface B thereof to the cylinder block as seen in FIG. 2. The generally straight portion of the intake port center line L intersects the side surface 16a of the cylinder head. The generally straight portion may be replaced with a gentle curve having a greater radius of curvature. It is to be noted that the curvature of the curved portion of the intake port center axis L is formed with a center C which lies between the extension N of the top surface 30a of the intake valve seat 30 and a plane N' parallel with the extension N and is spaced apart from the extension N in the range of 0 to 3 mm in the upward direction to separate it from the intake valve seat 30.

Projected into the intake port 26 is a cylindrical valve guide within which the stem connected to the intake valve head 22 is slidably supported though not shown. The reference numeral 36 indicates a device or means for supplying a portion of exhaust gases into the combustion chamber 20 through the intake port 26.

With the arrangement hereinbefore described, since the intake valve seat 30 is arranged at a right angle with respect to the intake port 26, the inner diameter of the valve seat 30 becomes equal to the diameter of the intake port 26 as a matter of course and therefore the pressure drop of the induction air passing through the intake port 26 considerably decreases. Furthermore, by curving the intake port 26 as mentioned above, the air-fuel mixture is extremely effectively charged into the combustion chamber 20 passing through the intake port 26. The experiments revealed that the most excellent flow coefficient of the air-fuel mixture was obtained when the radius R of curvature of the intake port center axis L is 0.75 times the minimum inner diameter $D_1$ of the intake valve seat 30.

Since the intake and exhaust valve heads 22 and 24 are spaced apart from each other in the direction of the longitudinal axis of the cylinder head 16, and the upstream portion of the intake port 26 is formed generally straight, the induction air passing through the intake port 26 generally tangentially enters the combustion chamber 20 and accordingly strong swirl turbulence of the air-fuel mixture is produced in the combustion chamber, resulting in uniform and homogeneous mixture of air and fuel.

Figure 3:
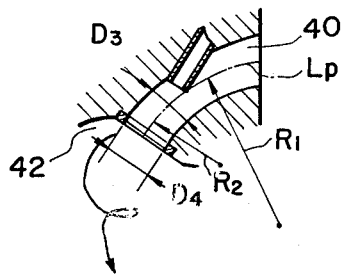
FIG. 3 is a longitudinal cross-section showing a prior art cylinder head configuration.
Figure 4:
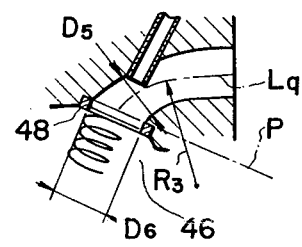
FIG. 4 is a longitudinal cross-section showing another prior art cylinder head configuration.

These effects and advantages according to the present invention will be seen in comparison with the prior art cylinder head configuration shown in FIGS. 3 and 4.

In FIG. 3, the center axis $L_p$ of an intake port 40 is formed with two curvatures the radii of which are respectively indicated by the arrows $R_1$ and $R_2$. In this case, the diameter $D_3$ of the intake port 40 becomes generally the same as the inner diameter $D_4$ of the intake valve seat and consequently the pressure drop of the induction air passing through the intake port 40 is relatively small. However, the swirl turbulence of the air-fuel mixture may not be effectively produced in the combustion chamber 42, because the induction air through the intake port 40 cannot tangentially enter the combustion chamber 42.

In FIG. 4, the intake port 44 is arranged such that the induction air enters the combustion chamber 46 generally tangentially to produce the swirl turbulence of the air-fuel mixture in the combustion chamber 46. However, the curvature of the center axis $L_q$ is formed with its radius $R_3$ with its center which lies considerably under the extension P of the top surface of intake valve seat 48. As a result, the diameter $D_5$ of the intake port 44 is smaller than the inner diameter $D_6$ of the valve seat 48 and therefore the pressure drop of the induction air passing through the intake port 44 becomes considerably large.

As is apparent from the foregoing discussion, according to the present invention, strong swirl turbulence of the air-fuel mixture is produced in the combustion chamber without a considerable increase of the pressure drop of the induction air passing through the intake port. As a result, effective mixing of air and fuel is accomplished in addition to the improved vaporization of the fuel. Therefore, the combustion time of the air-fuel mixture in the combustion chamber can be further shortened to obtain stable running of the engine though a considerable amount of exhaust gases is mixed with the air-fuel mixture in the combustion chamber.

What is claimed is:

1. An internal combustion engine having a cylinder block in which a cylinder is formed, comprising:
   a cylinder head formed with a concavity defining therein a combustion chamber, the surface of the concavity closing one end of the cylinder;
   means for supplying a portion of the exhaust gases of the engine into the combustion chamber of the engine;
   two spark plugs disposed at said cylinder head and projected into the combustion chamber, said two spark plugs being located such that their electrodes lie generally symmetrical with respect to the center axis of the cylinder;
   intake and exhaust valve heads which are respectively seatably disposed on annular intake and exhaust valve seats secured to the surface of the cylinder head concavity, said intake and exhaust valve heads being located such that the centers of said intake and exhaust valve heads are spaced apart from each other in the direction of a longitudinal axis of the cylinder head;
   an intake port formed in said cylinder head, said cylindrical intake port being connected at its one end to the combustion chamber through the intake valve seat and opening at its other end to one side of said cylinder head, the center axis of the intake port including a curved portion which is formed with the radius of curvature ranging from 0.73 times to 0.77 times the minimum inner diameter of the annular intake valve seat, the axis of the curved portion being joined at its one end to the center axis of the intake valve seat, and a generally straight portion generally parallel with the bottom surface of said cylinder head and connected to the other end of the curved portion, the cylinder head being secured at the bottom surface thereof to the cylinder block.

2. An internal combustion engine as claimed in claim 1, in which said intake and exhaust valve heads are disposed opposite to each other with respect to a longitudinal vertical plane parallel with the longitudinal axis of the cylinder head and passing through the center axis of the cylinder.

3. An internal combustion engine as claimed in claim 2, further comprising, an exhaust port formed in said cylinder head, said cylindrical exhaust port being connected at its one end to the combustion chamber through the exhaust valve seat and opening at the other end thereof to the opposite side of the one side at which the intake port opens.

4. An internal combustion engine as claimed in claim 1, in which said intake valve head is disposed such that the center axis thereof intersects the center axis of the cylinder at an angle ranging from 16.5° to 28.5°, as viewed from the direction of the longitudinal axis of said cylinder head.

5. An internal combustion engine as claimed in claim 1, in which the curvature of the curved portion of the intake port center axis is formed with a center which lies between the extension of the top surface of the intake valve seat and a plane parallel to the extension and spaced apart from the extension in the range of 0 to 3 mm in the direction to separate it from the intake valve seat, the intake valve seat top surface being opposite to the bottom surface on which the intake valve head is seatable.

6. An internal combustion engine as claimed in claim 1, in which the generally straight portion of the intake port center axis has an angle of inclination ranging from 0° to 8° with respect to the bottom surface of said cylinder head.

7. An internal combustion engine as claimed in claim 1, in which the radius of curvature of the curved portion of the intake port center axis is about 0.75 times the minimum inner diameter of the intake valve seat.

8. An internal combustion engine as claimed in claim 3, wherein said intake port and said exhaust port are cylindrical.

* * * * *